(12) United States Patent
Yokoyama

(10) Patent No.: US 7,164,755 B1
(45) Date of Patent: Jan. 16, 2007

(54) VOICE STORAGE DEVICE AND VOICE CODING DEVICE

(75) Inventor: Atsushi Yokoyama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/547,866

(22) Filed: Apr. 12, 2000

(30) Foreign Application Priority Data

Aug. 13, 1999 (JP) ................................. 11-229005

(51) Int. Cl.
*H04M 1/64* (2006.01)

(52) U.S. Cl. .................... 379/88.07; 379/80; 379/88.1; 375/240; 386/109

(58) Field of Classification Search ............. 379/88.07, 379/88.11, 88.08, 88.1; 375/240, 244; 386/109; 704/221; 370/230
See application file for complete search history.

(56) References Cited

U.S. PATENT DOCUMENTS

| | | | | |
|---|---|---|---|---|
| 4,682,350 | A * | 7/1987 | Akerberg | 455/403 |
| 5,014,318 | A * | 5/1991 | Schott et al. | 704/233 |
| 5,191,431 | A * | 3/1993 | Hasegawa et al. | 386/109 |
| 5,506,872 | A * | 4/1996 | Mohler | 375/240 |
| 5,761,275 | A * | 6/1998 | Irie | 379/88.07 |
| 5,781,882 | A * | 7/1998 | Davis et al. | 704/221 |
| 5,825,853 | A * | 10/1998 | Kojima et al. | 379/88.1 |
| 6,081,504 | A * | 6/2000 | Tanaka et al. | 370/230 |
| 6,256,354 | B1 * | 7/2001 | Yoshida et al. | 375/244 |

FOREIGN PATENT DOCUMENTS

| | | |
|---|---|---|
| JP | 02-305053 | 12/1990 |
| JP | 04-91558 | 3/1992 |
| JP | 06-69950 | 3/1994 |
| JP | 07-015519 | 1/1995 |
| JP | 7-73080 | 3/1995 |
| JP | 7-334200 | 12/1995 |
| JP | 8-221100 | 8/1996 |
| JP | 09-128276 | 5/1997 |
| JP | 09-214598 | 8/1997 |
| JP | 09-284202 | 10/1997 |
| JP | 10-191245 | 7/1998 |
| JP | 10-210139 | 7/1998 |
| JP | 11-136606 | 5/1999 |
| JP | 2001-160012 | 6/2001 |
| WO | WO-9602895 | 2/1996 |

* cited by examiner

*Primary Examiner*—Fan Tsang
*Assistant Examiner*—Gerald Gauthier
(74) *Attorney, Agent, or Firm*—Venable LLP; Michael A. Sartori; Catherine M. Voorhees

(57) ABSTRACT

The voice storage device of the invention includes a storage means that stores a voice signal, and a voice compression means that compresses the voice signal requiring a re-coding compression, of the voice signal stored in the storage means, in accordance with a compression degree and a significance of the voice signal. The voice coding device includes: an LSP quantizer that quantizes LSP parameters, an LSP multi-stage quantizer that quantizes quantization error components that the LSP quantizer is impossible to express, a pitch component coder that attains pitch components from linear predictive errors, an excitation source coder in which an excitation source is configured with a multi-stage code book, an essential code output unit that outputs a code essential to decoding from the output of the LSP quantizer, the pitch component coder, and the excitation source coder, and a sound quality improving code output unit that outputs a code to improve a decoded sound quality from the output of the LSP multi-stage quantizer and the excitation source coder.

16 Claims, 12 Drawing Sheets

210 HEADER

211 ID FIELD
212 SIGNIFICANCE FIELD

| ID | CONTENTS OF PACKET |
|---|---|
| 1 | EMPTY |
| 2 | PCM CODE |
| 3 | 8kbps CELP |
| 4 | 4kbps CELP |
| 5 | NON-VOCALIZATION |
| 6 | TRAILING END |

VOICE STORAGE DEVICE AND VOICE CODING DEVICE

BACKGROUND OF THE INVENTION

The present invention relates to a voice storage device and a voice coding device suitable for use in a digital coding recording type telephone answering device, or the other digital coding voice recorders.

The telephone answering device has been used to be incorporated into a fixed subscriber telephone terminal or a portable telephone terminal. The telephone answering device is a means to record a voice of a message sender in the built-in recording medium (magnetic tape or semiconductor memory), when the terminal user is unable to respond to the telephone call, also called as the voice mail.

In recent years, since semiconductor LSI circuits have become available which can implement a digital signal processing at a low cost, there has been proposed a telephone answering device using the system that compresses a talker's voice by a high efficiency coding algorithm such as the CELP (code excitation linear predictive coding) and stores the result in a recording medium. Thereby, the telephone answering device using the foregoing system will record more voices than one using the normal PCM (Pulse Code Modulation) system or the ADPCM (Adaptive Differential Pulse Code Modulation) system, when both of them use a recording medium having a same recording capacity. Further, the use of a semiconductor memory will implement to quickly select and reproduce a specific message out of plural massages.

Also, the telephone answering device has been incorporated into a portable telephone terminal. But, because of the user's demand for the miniaturization of the terminal, there is a heavy restriction to the capacity of the semiconductor memory that can be incorporated into the terminal. Accordingly, the use of the normal CELP system could not have realized a sufficient voice recording time to a requested degree.

From such situations, a method of combining a voice activity detector with the telephone answering device is accepted in practice. In this method, a talker's vocalization is monitored when recording a message voice through the coding compression in the medium. This is implemented by comparing a voice gain to a threshold, for example. Using this comparison result, in the time of an interval from a vocalization to a next (non-vocalization interval), namely in the interval of a comparably low importance, the coding and recording of the voice is suspended, and only the information of a continued time of the non-vocalization interval is recorded in the medium. As a result, the coding efficiency can apparently be increased, whereby the efficiency in use of the recording medium is enhanced.

With regard to the identification of a voice interval is proposed a method of using the information on the gain or pitch (frequency components) of a voice, but when the signal-to-noise (S/N) ratio against the background noise of the voice is deteriorated, the detection capability of the voice is apt to be lowered. Concretely, in the vocalization interval adjacent to a non-vocalization interval, the voices at the beginning of a word and the ending of a word are misidentified as the non-vocalization interval, and the voice is likely to be missed accordingly.

SUMMARY OF THE INVENTION

The present invention has been made in view of the technical difficulties of precisely detecting a voice interval, and it is an object of the invention to provide an implement that enables a clear recording of a message voice when the residual capacity of a recording medium is ample, and enables a significant improvement of the missing of a voice, especially the missing at the beginning of a word when the residual capacity becomes marginal.

In order to accomplish the foregoing object, the invention discloses a voice storage device that stores a digitally coded voice, including a storage means that stores a voice signal, and a voice compression means that compresses the voice signal requiring a re-coding compression, of the voice signal stored in the storage means, in accordance with a compression degree and a significance of the voice signal. Further, the storage means may be designed to store the packeted voice signal by each coding type. Furthermore, the invention discloses a voice coding device, including: an LSP quantizer that quantizes LSP parameters, an LSP multi-stage quantizer that quantizes quantization error components that the LSP quantizer is impossible to express, a pitch component coder that attains pitch components from linear predictive errors, an excitation source coder in which an excitation source is configured with a multi-stage code book, an essential code output unit that outputs a code essential to decoding from the output of the LSP quantizer, the pitch component coder, and the excitation source coder, and a sound quality improving code output unit that outputs a code to improve a decoded sound quality from the output of the LSP multi-stage quantizer and the excitation source coder.

DESCRIPTION OF THE PREFERRED EMBODIMENTS (1) First Embodiment

The first embodiment of a voice storage device and a voice coding device according td the invention will now be discussed with reference to the accompanying drawings.

(1-1) Configuration of the First Embodiment

Figure 1:
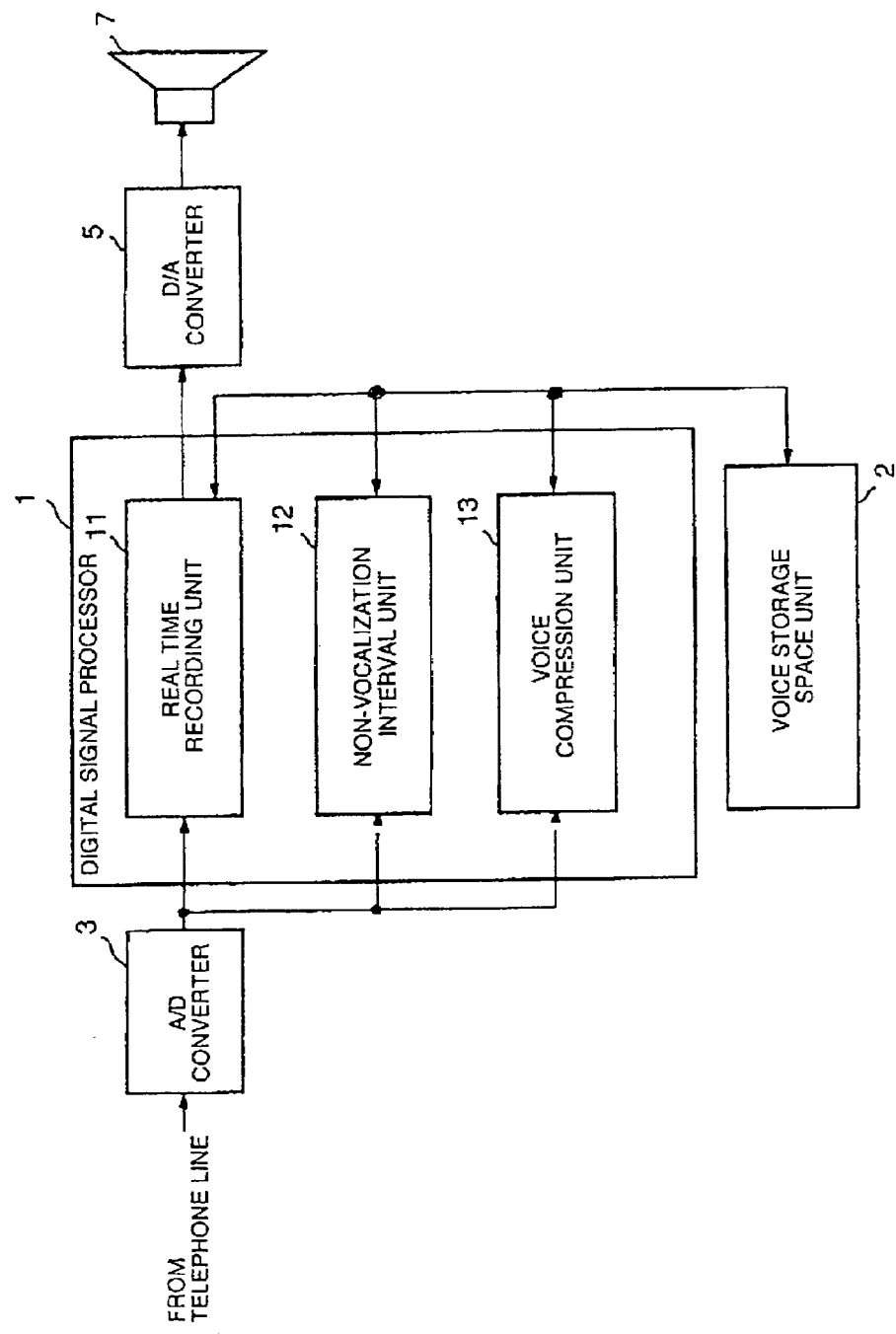
FIG. 1 is a block diagram illustrating the total configuration of the first embodiment.
Figure 2:
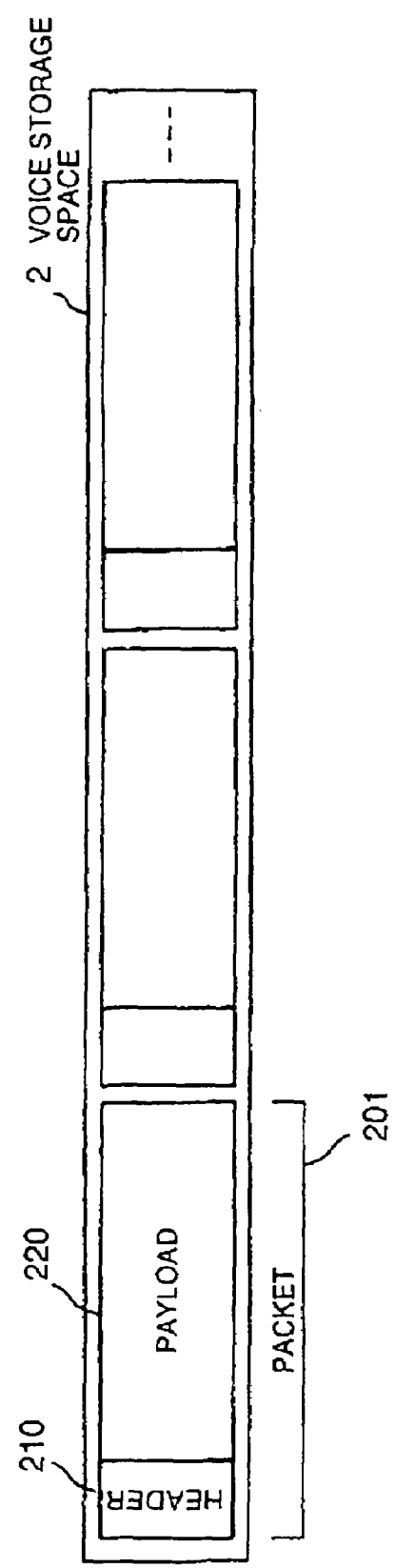
FIG. 2 is a chart illustrating a configuration of a voice storage space of the first embodiment.

FIG. 1 illustrates a schematic configuration of a telephone answering device including a digital signal processor 1 and a voice storage space 2. The voice storage space 2 adopts a semiconductor memory conventionally used in recording a coded compressed voice in order to record the codes by the PCM. FIG. 2 illustrates a configuration of the voice storage space 2 inside the semiconductor memory, which is intended to implement the first embodiment. The voice storage space 2 stores plural packets 201. Each packet is configured with a variable length header 210 and a variable length payload 220, and is generated by the digital signal processor 1 or a packet generation means (not illustrated) individually provided thereto.

A voice is divided into frames in a unit of 20 milliseconds, and coded. Each frame is stored in each packet. The time assigned to a voice that each packet (except for those not containing voices, such as a empty packet described later and non-vocalization packet, etc.) handles is invariably 20 milliseconds, but the physical size (byte count) of a code is variable. Each packet contains the code of a voice signal expressed by the PCM code, the code compressed according to the CELP system, and the like.

The telephone answering device, each time receiving a call, records a message in the voice storage space 2, when the terminal user does not responds to the call. The voice storage space 2 is able to record plural messages as long as the capacity permits. Hereunder, each message is referred to as a voice message.

Figures 3, 4:
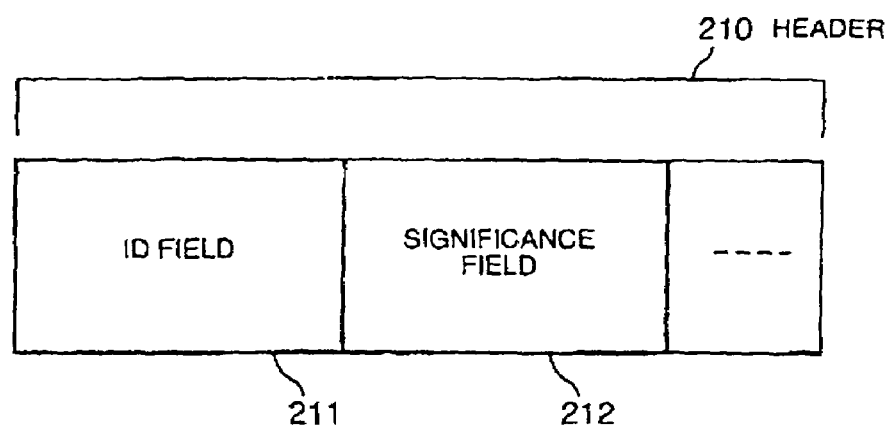
FIG. 3 is a chart illustrating a configuration of a header of a packet of the first embodiment.
FIG. 4 is a table illustrating a type of the packet of the first embodiment.

As shown in FIG. 3, the header 210 in the packet 201 is configured with a plurality of information fields. One of the information filed is an ID field 211 of 4 bits, which indicates the type of the packet. This embodiment holds the type of the packet as shown in FIG. 4.

The empty packet (ID=0) corresponds to a virgin area in the voice storage space 2. As described later, the space areas made in the memory by the compression and re-compression of a voice signal are implemented by the empty packet. The header of the empty packet includes the information field indicating the size of the packet (packet length), and the contents of the payload are a set of undefined value data.

The PCM code packet (ID=1) contains a voice signal coded by the PCM coding. In case of the 16 bit quantization PCM with 8 KHz sampling, the size of the payload of the packet is 320 bytes.

The 8 kbps CELP code packet (ID=2) contains a voice signal coded by the CELP system with the coding rate of 8 kilo bits per second. The size of the payload of the packet is 20 bytes.

The 4 kbps CELP code packet (ID=3) contains a voice signal coded by the CELP system with the coding rate of 4 kilo bits per second. The size of the payload of the packet is 10 bytes.

The non-vocalization packet (ID=4) represents a non-vocalization interval. The payload contains a time (frame count) of the non-vocalization interval. The size of the payload of the packet is 1 byte. To give a non-vocalization interval of more than 257 frames, it is divided into plural non-vocalization packets.

The trailer packet (ID=5) is an index representing the trailing end of each voice massage. The size of the payload of the packet is 0 byte.

The header of each packet (excluding a packet not containing a voice, hereafter called as a voice packet) is further provided with a significance field 212 of 4 bits indicating the significance of a frame. The frame significance is represented by the numerical value from 0 to 15, and the larger value means that the voice information contained in the concerned packet has a greater significance. The voice during a vocalization interval has a greater significance than the voice during a non-vocalization interval. The message voice that is not only once reproduced, and that the terminal user has not confirmed the contents has a higher significance than the message voice that has once been reproduced. The reference with regard to the significance can be determined separately by various factors such as the applications of the telephone answering device, etc. The frame significance 0 has an exceptional meaning, which means that the significance of the voice frame of the concerned packet is not yet determined.

The digital signal processor 1 includes a real time recording block 11, a non-vocalization interval detection block 12, and a voice compression block 13. These blocks operate in parallel, and with regard to the operational priority, the highest is given to the real time recording block 11, the next is given to the non-vocalization interval detection block 12, and the lowest is given to the voice compression block 13. These blocks can be implemented by either a hardware circuit, or a software program.

The real time recording block 11 stores a message voice in the voice storage space 2. In this embodiment, it stores the voice as the PCM code packet in the voice storage space 2. At this stage, the frame significance is set to 0 (not determined).

The non-vocalization interval detection block 12 determines the frame significance according to whether a voice frame corresponds to the vocalization interval or to the non-vocalization interval, and records the result. In this embodiment, the significance is selected among the values of more than 1 and less than 15. As the selection method, for example, the value is selected by comparing an input power with a specific threshold. And, the value 15 is set to the voice frame most likely to be the vocalization interval, and the value 1 is set to the voice frame most likely to be the non-vocalization interval.

Figure 5:
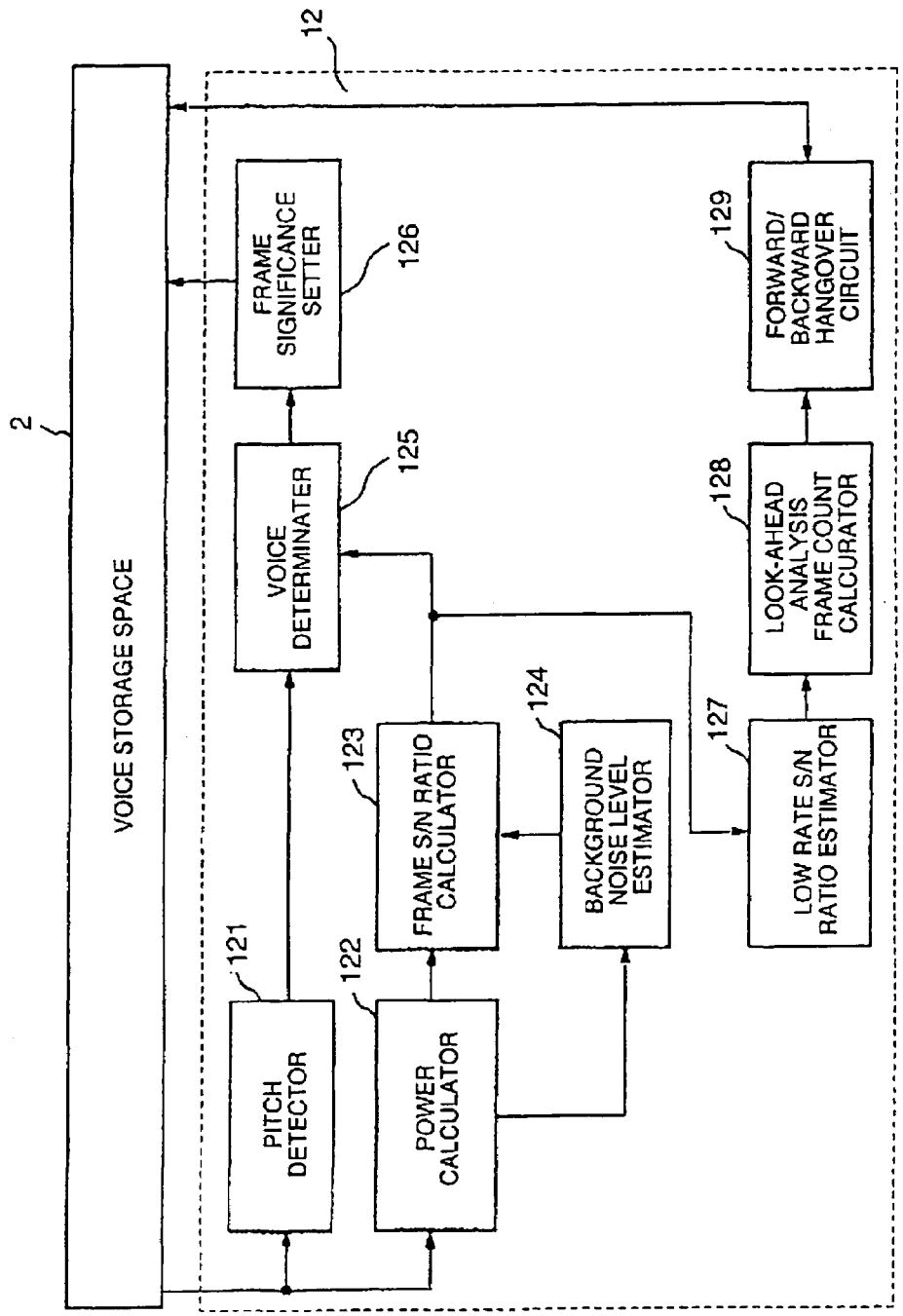
FIG. 5 is a block diagram of a non-vocalization interval detection block of the first embodiment.

Next, referring to FIG. 5, the non-vocalization interval detection block 12 will be described. A pitch detector 121, using a voice signal of a frame inside the voice packet, detects the frequency of pitch components contained in the voice and the predictive gain thereof. A power calculator 122 calculates the power of a voice frame. A frame S/N ratio calculator 123 compares estimated values of the voice frame power and the background noise level to thereby acquire an S/N ratio of each frame. A background noise level estimator 124, using the acquired voice power, traces the lowest gain level of the background noise. A voice determinater 125 determines a voice likelihood of the concerned frame, by using the pitch frequency and the pitch predictive gain and the frame S/N ratio. A frame significance setter 126, using the output from the voice determinater 125, sets a frame significance information of the packet of the voice frame. A low-speed varying S/N ratio estimator 127 applies a low-pass filtering to the output from the frame S/N ratio calculator 123, to thereby output the low-rate varying components thereof. A look-ahead analysis frame count calculator 128 calculates a look-ahead frame count described later, by using the low-rate varying S/N ratio. A forward/backward hangover circuit 129 operates with a delay of the look-ahead analysis frame count, and increases the frame significance of the frame before and after the timing when the frame significance of the past voice frame is more than a certain threshold.

Figure 7:
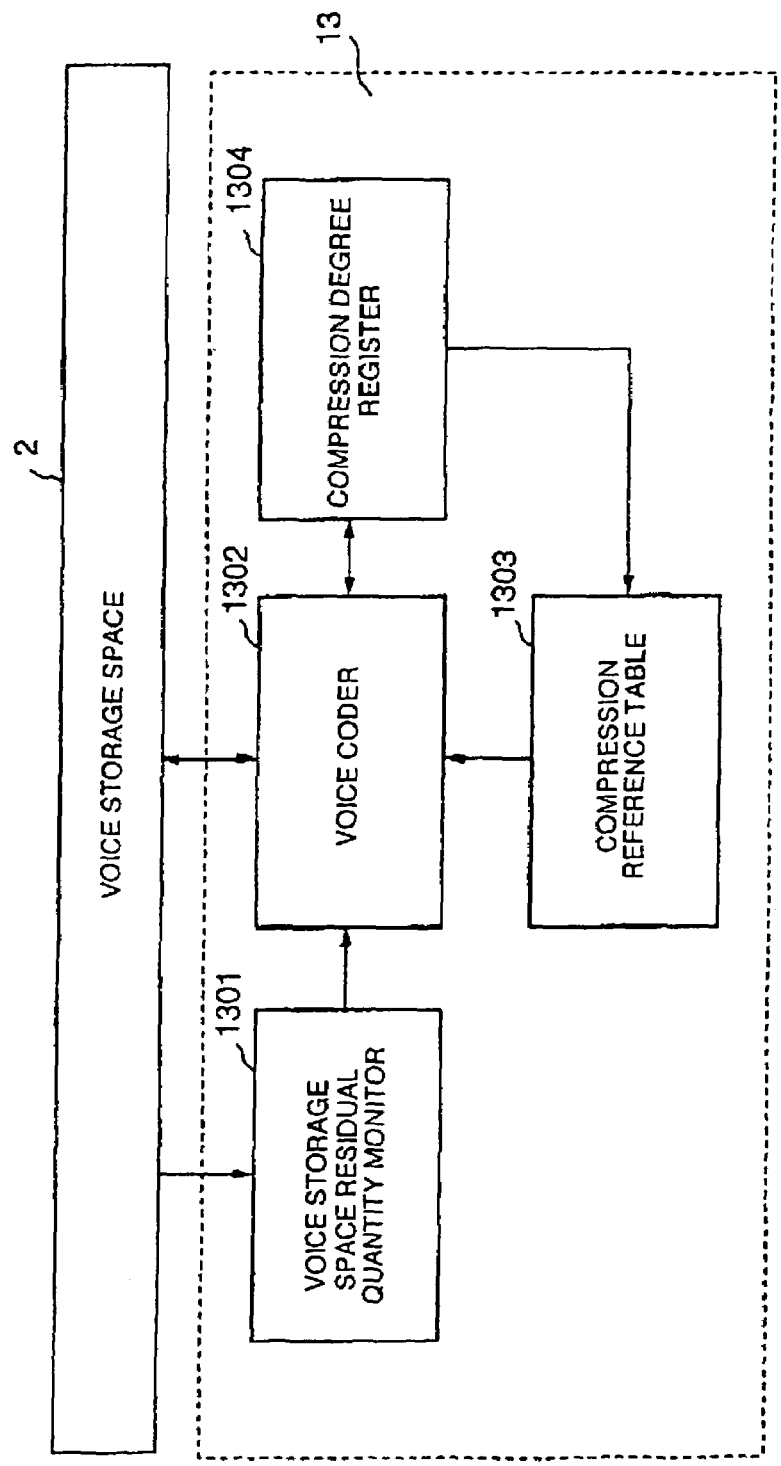
FIG. 7 is a block diagram of a voice compression block of the first embodiment.

Next, referring to FIG. 7, the voice compression block 13 will be described. A voice storage space residual quantity monitor 1301 invariably monitors a residual quantity of the voice storage space 2. A voice coder 1302 compresses a PCM coded voice signal by the CELP system. A compression reference table 1303 decides a coded ID in accordance with a desired compression degree and the frame significance. A compression degree register 1304 holds the current desired compression degree. This register is made up with a nonvolatile semiconductor memory that holds a memory by a cell and the like, in the same manner as the semiconductor memory accommodating the voice storage space 2.

Figure 8:
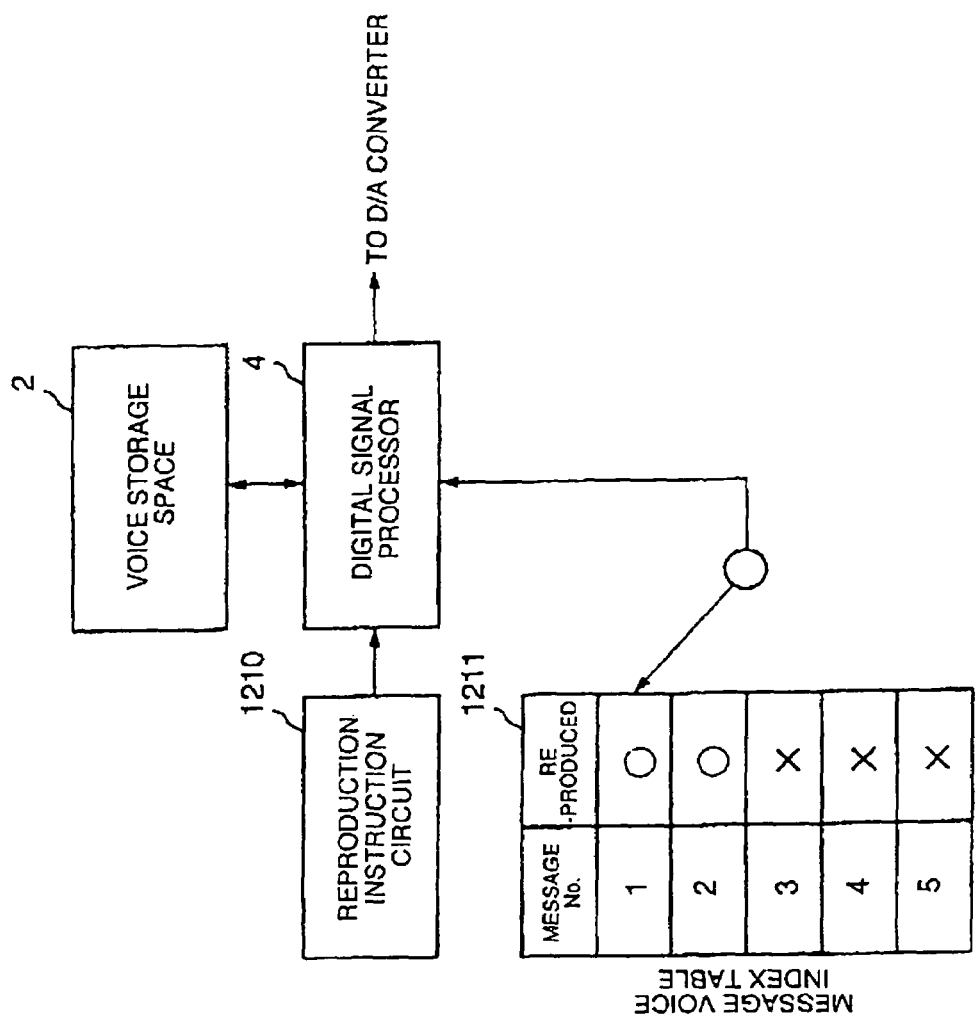
FIG. 8 is a chart illustrating a configuration that sets a frame significance of the first embodiment.

FIG. 8 illustrates a configuration whereby the frame significance is set. A reproduction instruction circuit 1210 instructs a reproduction of a message voice held in a telephone answering device. A message voice index table 1211 records by each message voice whether or not the concerned message voice is reproduced more than once. If the message voice is reproduced more than once, the whole frame significance of the concerned message voice will belowered.

(1-2) Operation of the First Embodiment

The real time recording block 11 stores a voice in the voice storage space 2 as the PCM code packet. At this moment, the frame significance is set to 0 (not determined).

The non-vocalization interval detection block 12 operates with a delay of a certain variable time from the frame that the real time recording block 11 is processing. This is because the real time processing is difficult to discriminate between the vocalization interval and the non-vocalization interval with high precision. The delay time is determined in accordance with the S/N ratio against the background noise of a voice. For example, when the S/N ratio against the background noise of a voice is sufficiently high, the detection block 12 operates with the delay of 20 frames. That is, when the real time recording block 11 is packeting the $n^{th}$ frame, the non-vocalization interval detection block 12 processes the $(n-20)^{th}$ frame. On the contrary, when the S/N ratio against the background noise of a voice is low, since the determination becomes difficult, the detection block 12 operates with a delay of the more frames. When the S/N ratio is 5 dB, it operates with the delay of 50 frames. Generally, the lower is the S/N ratio, the more difficult becomes the discrimination between the vocalization interval and the non-vocalization interval. Specially, during the vocalization interval immediately after the non-vocalization interval (namely, at the beginning of a word), the beginning of a word can correctly be identified as the vocalization interval by looking ahead more voice frames and analyzing them. Accordingly, the non-vocalization interval detection block 12 is designed to detect the non-vocalization interval with more delay as the S/N ratio is lower.

Figure 6:
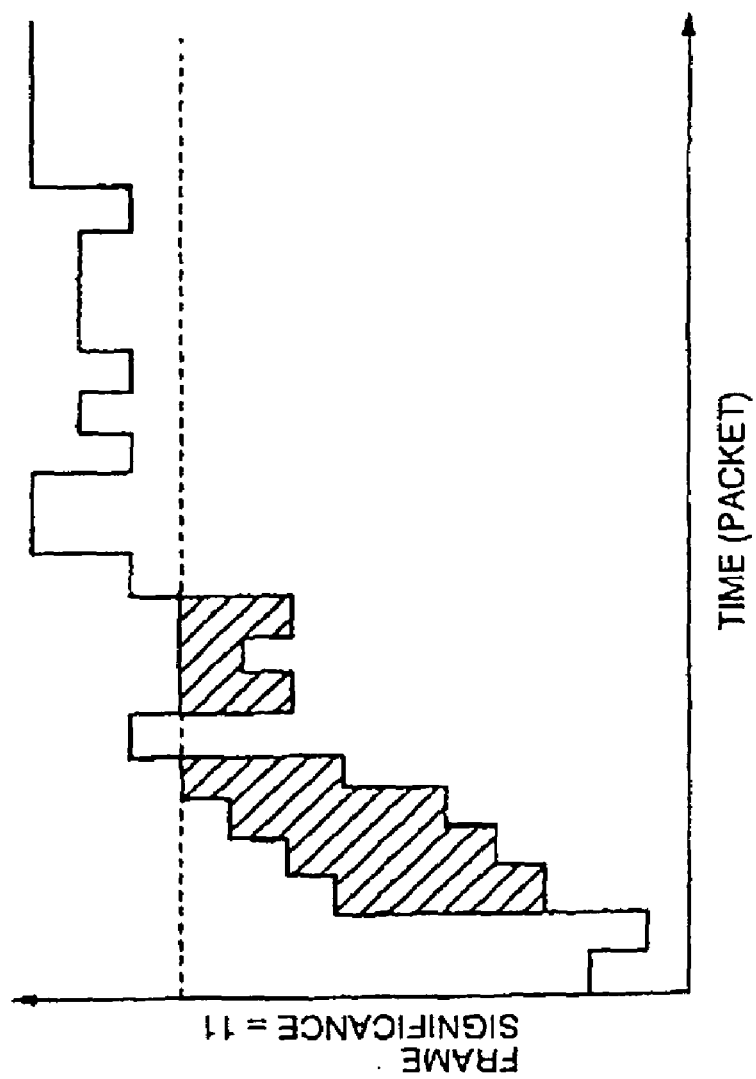
FIG. 6 is a chart illustrating the operation of a forward/backward hangover circuit of the first embodiment.

Next, on the basis of a configuration of the non-vocalization interval detection block 12 in FIG. 5, the operation thereof will be described. The pitch detector 121 applies a linear prediction to a discrete signal of an input voice extracted from the voice packet in the voice storage space 2, applies a processing to the residual signal of the discrete signal, and thereby detects the pitch frequency and pitch predictive gain to output them to the voice determinater 125. These parameters represent whether the input voice is likely to be a human voice. The power calculator 122 accumulates the sum of squares of each of the sampled values from the discrete signal of the input voice extracted from the voice packet in the voice storage space 2 to thereby calculate the power value by each voice frame, and outputs the calculation result to the frame S/N ratio calculator 123 and the background noise level estimator 124. The frame S/N ratio calculator 123 calculates the difference between the output from the power calculator 122 and the output from the background noise level estimator 124 to thereby attain the S/N ratio of each voice frame, and outputs it to the voice determinater 125 and the low-rate varying S/N ratio estimator 127. The background noise level estimator 124 traces on the time base the lowest power level of the input voice on the basis of the output from the power calculator 122 to thereby estimate a background noise level superposed on the voice signal, and outputs the result to the frame S/N ratio calculator 123. The voice determinater 125 determines the voice likelihood of a signal of the concerned frame, by using the pitch frequency and pitch predictive gain outputted from the pitch detector 121 and the information of the frame S/N ratio outputted from the frame S/N ratio calculator 123, and outputs the acquired voice likelihood to the frame significance setter 126. The value of the voice likelihood becomes high during the vocalization interval, and becomes low during the non-vocalization interval. In general, when the frame S/N ratio is high, it is considered as the vocalization interval. But, even if the frame S/N ratio is high, when the pitch frequency deviates from a certain interval (within the frequency range of a human voice) or the pitch predictive gain is low, it is considered as an acoustic signal that is not likely to be a human voice. Totally evaluating these information, the voice determinater 125 outputs an information of the voice likelihood. The frame significance setter 126 normalizes the output from the voice determinater 125 into the values from 1 to 15, and thereby determines the frame significance parameter. This value is stored in the frame significance information field that exists in the header of the voice packet, in the voice storage space 2. The low-rate varying S/N ratio estimator 127 smoothes the output from the frame S/N ratio calculator 123 by a low-pass filter, and thereby outputs an S/N ratio estimation information varying at a low speed to the look-ahead analysis frame count calculator 128. The look-ahead analysis frame count calculator 128 determines a frame count to which the forward/backward hangover circuit 129 executes the look-ahead analysis, on the basis of the low speed varying S/N ratio estimation information outputted form the low-rate varying S/N ratio estimator 127. When the S/N ratio estimation is high (for example, 40 dB), the calculator 128 determines that the frame count to be analyzed is 20 frames. On the contrary, when the S/N ratio estimation is low (about 5 dB), the calculator 128 determines that the frame count to be analyzed is elongated into 50 frames. In this manner, inversely proportional to the S/N ratio estimation, the look-ahead analysis frame count is determined. The forward/backward hangover circuit 129 starts to operate with a delay of a certain frame count from the frame to which the frame significance setter 126 sets a frame significance information. This frame count is the one acquired by the look-ahead analysis frame count calculator 128. When the frame significance of a watched voice frame is more than a certain value (here, more than 12), the forward/backward hangover circuit 129 adjusts the frame significance for only the look-ahead frame count in both the forward and the backward direction. Concretely, the hangover circuit 129 adds 4 to the frame significance, however it is not to exceed 11 (11 is the value subtracted by 1 from the foregoing value 12). Thereby, when the S/N ratio against the background noise of a voice is low, the frame significance before and after the vocalization interval (at the beginning of a word and the ending of a word) is lowered, which prevents the vocalization interval from being misjudged as the non-vocalization interval. In other words, it is possible to provide the non-vocalization interval detection block 12 with the function that prevents a missing at the beginning of a word and the ending of a word. FIG. 6 illustrates a graph of the operation.

In the graph, the axis of abscissas represents the time (packet), and the axis of ordinates represents the frame significance of a voice of the concerned packet. The hatched part shows that the frame significance is increased by the forward/backward hangover circuit. This confirms a situation that the frame significance is appropriately corrected at the beginning of a word.

When the residual capacity of the voice storage space 2 in the semiconductor memory is sufficiently large (which is judged, for example, by comparing this with the threshold of the residual capacity), further processing will not be made. That is, if the storage space has an ample margin, all the message voices will be made to be recorded by the PCM code, and a satisfactory sound quality is secured during the reproduction of the message voice.

When the residual capacity of the voice storage space 2 becomes small, the voice compression block 13 starts to operate. The block 13 scans the voice packet in the voice storage space 2, and compresses to code a voice in accordance with the frame significance set by the frame significance setter 126. The block 13 refers to a reference table as an example shown in FIG. 10, and thereby determines a coding ID from the combination of the compression degree and the frame significance. For example, at first (in case of all the packets being the PCM code packet), all the voice frames are compressed by the 8 kbps CELP (ID=2) regardless of the frame significance. When the residual capacity of the storage space becomes still imminent, the voice frames are re-compressed by the 4 kbps CELP (ID=3) in the ascending order of the frame significance. When the residual capacity becomes still further imminent, all the voice frames of which the frame significance is more than 4 are coded to be compressed by the 4 kbps CELP (ID=3), and all the others are converted into non-vocalization packets (ID=4). Finally, when the storage space is fully occupied, a new message voice cannot be recorded until part of messages recorded are deleted.

Figure 9:
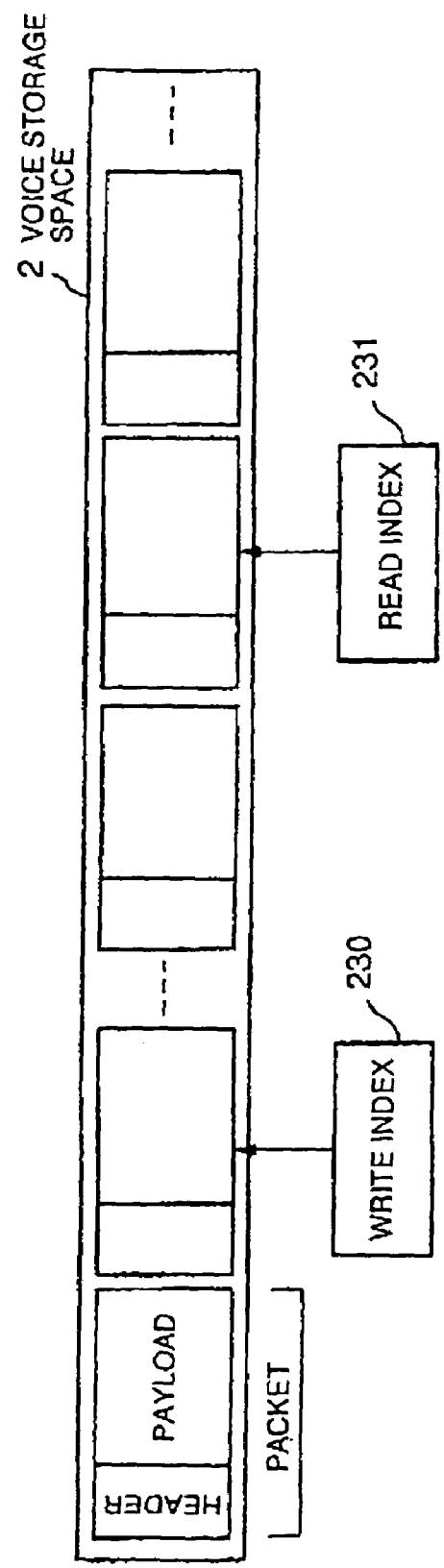
FIG. 9 is a chart illustrating the operation in which a write index and a read index are provided in the voice storage space.

The operation of the voice compression block 13 will be described with reference to the flow chart in FIG. 11. If the residual quantity of the voice storage space 2 has a margin, the voice compression block 13 will not operate. But, when the voice storage space residual quantity monitor 1301 detects that the residual quantity of the voice storage space 2 becomes lower than a certain threshold (for example, 20%), the voice storage space residual quantity monitor 1301 starts to operate. The voice coder 1302 reads the value of the compression degree register 1304 (step S1). The voice coder 1302 reads the packets containing the voice frames in the voice storage space 2, from the leading packet (step S2). And, the voice coder 1302 searches the compression reference table 1303 by using the frame significance of the voice frame and the foregoing compression degree register 1304, and determines the coding system of a packet type whereby the concerned frame is converted (step S3). The compression reference table 1303 will be described later. When the packet type acquired by the compression reference table 1303 is different from the current packet type, the voice coder 1302 compresses the voice signal of the concerned packet by the coding system of a new packet type. For example, when the original packet type is the PCM code and the new packet type is the 8 kbps CELP, the PCM code extracted from the payload of the packet is compressed to be coded by the CELP algorithm of the 8 kbps coding rate. And, the code after compression is organized again as a packet, and the header of the concerned packet is set again and saved in the voice storage space 2 (step S4). Since the new packet requires only a small storage space owing to the coding compression in comparison to the original packet, the latter half of the packet becomes an empty space. To leave it as it is will scatter small divided empty packets, and accordingly two indexes (write index 230 and read index 231) are provided in order to read and write the voice storage space 2 shown in FIG. 9. The original packet before compression is read by using the read index 231. The new packet after compression is written by using the write index 230. Since the new packet will not become larger than the original packet, the write index 230 will not come after the read index 231 (right in the drawing). As the indexes, a pointer or a counter, for example, is served. To set an empty space as an empty packet, ID=0 as the empty packet is written in the ID field, and the size of the packet is written in the packet length field. After the foregoing processing, the empty packet is collected principally in the latter half of the voice storage space 2. As an exception, when the recording of a new message voice becomes necessary during the operation of the voice compression block 13, the operation of the voice compression block 13 will unavoidably be suspended. In this case, the empty packet will sit in the middle of the voice storage space 2. As to such an empty packet, for example, an empty packet collection block is added to the digital signal processor 1, whereby the empty packet is collected by the function of the block. As an example for this operation, the "garbage collection" can be cited which is a general technique and is utilized in the computing engineering. Further, in the sequential reading of the voice storage space 2, when an empty packet is detected, the size of the empty packet is examined by referring to the header, and the voice storage space 2 can be skipped by the size thereof. However, if there are small empty packets dispersed, it is inconvenient in recording the voice message again afterwards, and it is desirable to keep operating the empty packet collection block as long as possible. The foregoing processings are repeated to all the voice packets in the voice storage space 2 (step S5, S6). However, if the residual quantity of the voice storage space 2 does not become larger than the threshold of the residual quantity, with the processing completed to the end, the following processing will be executed. First, the value read from the compression degree register 1304 is increased by 1 (step S9). And, the foregoing voice packet compression processing is rerun from the leading packet of the voice storage space 2. At the moment the residual quantity of the voice storage space 2 has become larger than the threshold of the residual quantity, the value of the compression degree at that moment is stored in the register 1304, thus completing the processing of the voice compression block 13 (step S7, S8).

Figure 10:
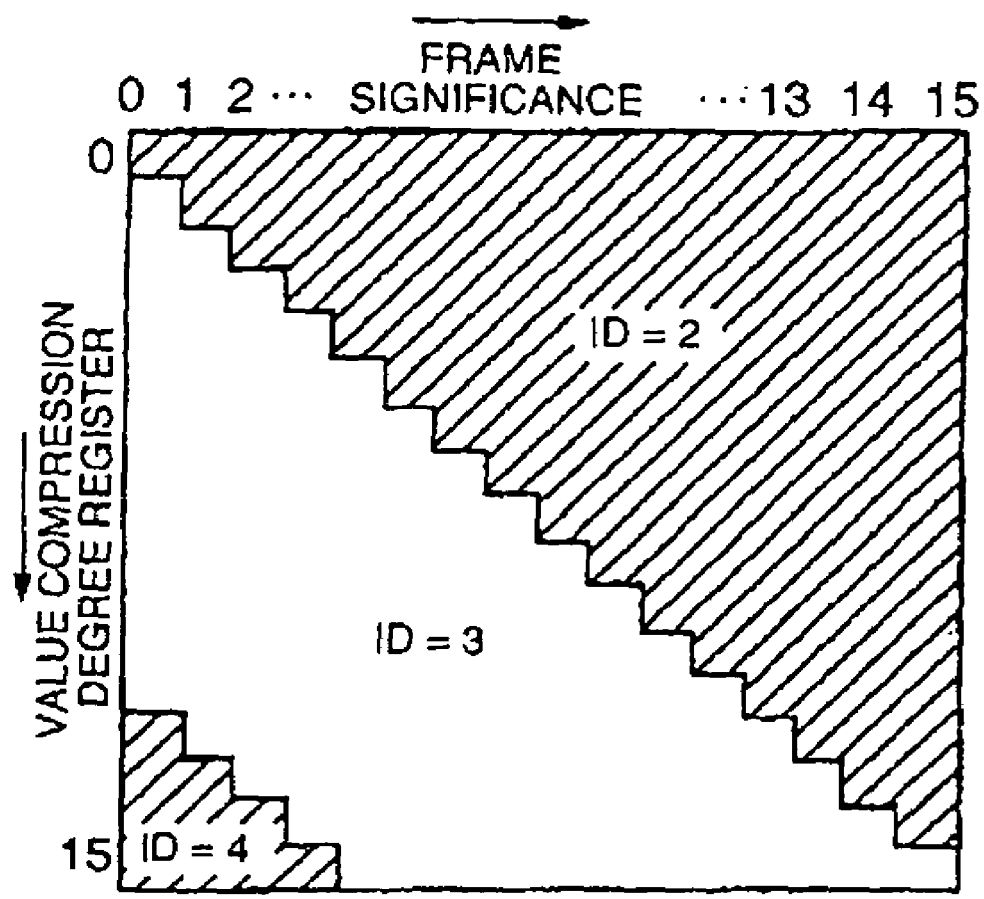
FIG. 10 is a chart illustrating a compression reference table of the first embodiment.

An example of the compression reference table 1303 is illustrated in FIG. 10. At the moment the residual quantity of the voice storage space 2 has become smaller than the threshold during the recording of a message voice (namely, in the middle of the operation of the real time recording block 11), the voice compression block 13 can be operated in parallel to the operation of the real time recording block 11. At this moment, the real time recording block 11 is made to be operated in the first priority, and the voice compression block 13 compresses a voice within the capability of the digital signal processor 1, thus expanding the residual quantity of the voice storage space 2. As the result, when the packet index of the voice compression block 13 catch up to the packet index of the real time recording block 11, the voice compression block 13 transmits a signal to the real time recording block 11 to restore the packet index of the real time recording block 11 to the leading position of the empty packet. Thereby, the real time recording block 11 is able to expand the residual space of the voice storage space 2.

Next, the setting operation of the frame significance will be described referring to FIG. 8. As a user of a telephone answering device instructs the reproduction of any message out of recorded message voices through a reproduction instruction circuit 1210, the digital signal processor 1 extracts the packets sequentially from the leading packet of the instructed message voice, from the voice storage space 2 of the semiconductor memory, and decodes the voice according to the coding ID mode of the header to reproduce. When the message voice is completely reproduced, the digital signal processor 1 scans the headers of all the packets that belong to the message voice, and reduces the frame significance information by a certain value (in this case, 4). Thereafter, in order not to repeatedly reduce the frame significance even through repeated reproductions of a same message voice, a mark is attached to a filed indicating that the message index of the message voice index table 1211 has experienced a reproduction. Thereby, repeated reproductions of the message voice with the mark once attached to the field will not reduce the frame significance again. At this stage, though only the frame significance is changed, when the voice compression block 13 starts to operate by the reduction of the residual quantity of the voice storage space 2 which occurs later, then for the first time, the re-compression is executed to the message voice reproduced more than once, whereby the residual quantity of the voice storage space 2 is expanded.

(1-3) Effect of the First Embodiment

According to the first embodiment as described above, by setting the frame significance subdivided more than the number of usable coding systems, separating the non-vocalization interval detection block 12 and the voice compression block 13, and making the voice compression block 13 operate only when necessary, even though the packets have a same frame significance, as long as the voice storage space 2 in the semiconductor memory has a margin, it becomes possible to maintain the recording of a voice by the PCM code as it is, as to the message voice recorded most lately. Thus, the first embodiment effects to maintain the sound quality of the recorded message voice as high as possible.

Also, when the number of recorded messages has increased, it is possible to compress the voice by a high efficient coding system (CELP, etc.), by the lowest necessary degree in accordance with the total recording time of the message voice. Since the voice compression processing is executed in non-conversation, the processing is able to compress a voice without imposing a heavy load to the digital signal processor 1 in conversation. By using the compression reference table, it becomes possible to restrict the number of the packets to which the re-compression become necessary, and to further reduce the load to the digital signal processor 1. In the determination of the non-vocalization interval, since the voice with a sufficient time is read to be analyzed, the determination accuracy can be enhanced, and the recording missing at the beginning of a voice immediately after the non-vocalization interval can be prevented.

Further, a reduction of the frame significance belonging to a once reproduced message voice will lead to reducing the voice storage space 2 that a message voice with the contents already confirmed consumes. On the other hand, if the frame significance is reduced more than necessary, the frame will be handled as a non-vocalization packet, and finally the frame will become impossible to be decoded into a voice. Accordingly, an attachment of a mark to the field that indicates "already reproduced" in the message voice index table will prevent the frame significance from being reduced more than necessary, although a same message voice is repeatedly reproduced. Also, by the change of the frame significance information and by splitting the voice compression block 13, and by not executing the coding compression to a voice more than necessary, although the packets having a difference in the frame significance are present at the same time, as long as there is a margin in the voice storage space 2 of the semiconductor memory, the sound quality of the recorded message voice can be maintained.

(2) Second Embodiment

Next, the second embodiment of the voice storage device and the voice coding device according to the invention will now be discussed with reference to the accompanying drawings. The second embodiment is an improvement from the first embodiment in regard to the voice compression block 13, and the voice compression block 13 will mainly be described.

(2-1) Configuration of the Second Embodiment

Figure 12:
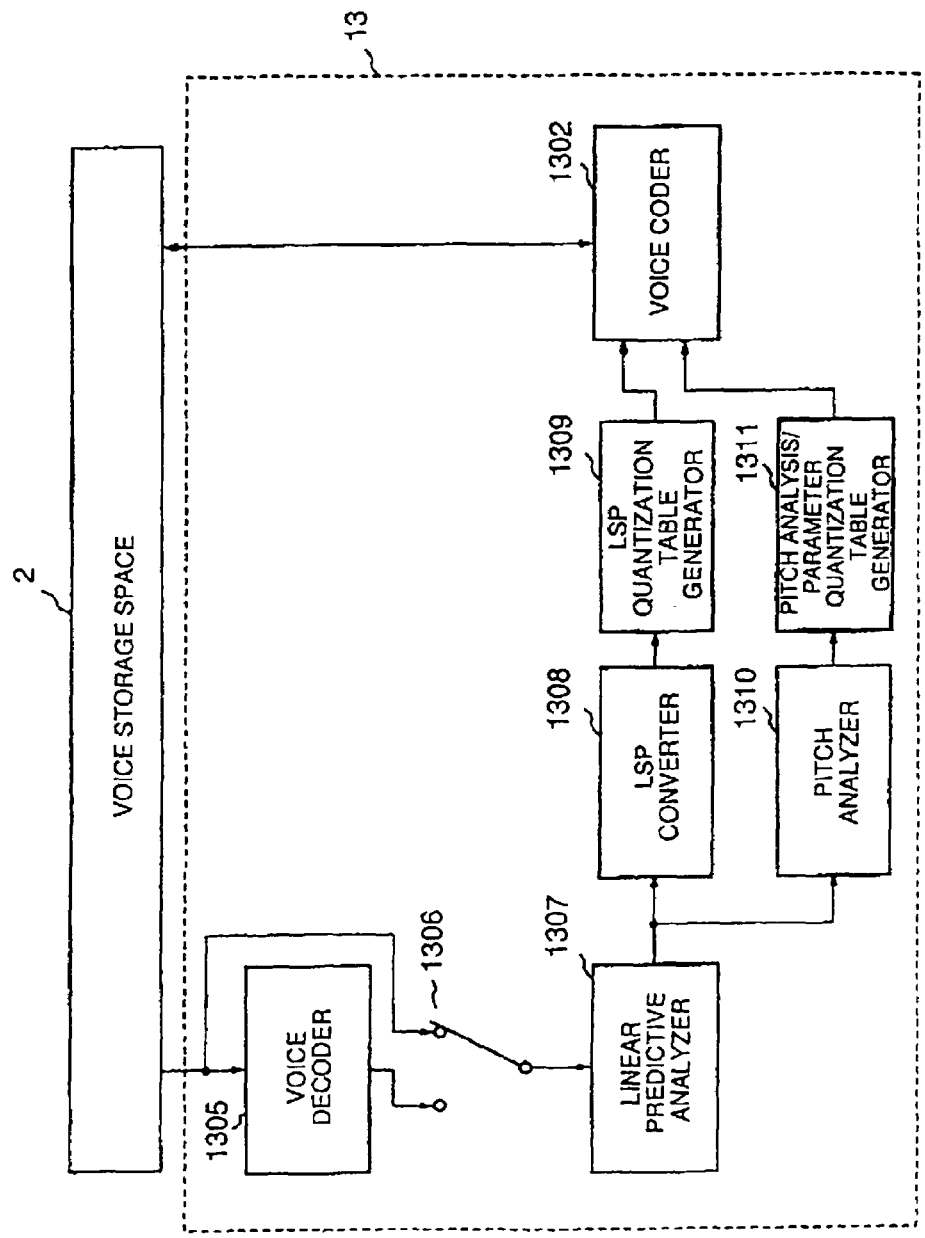
FIG. 12 is a block diagram of a voice compression block of the second embodiment.

FIG. 12 illustrates a voice compression block 13 that implements the second embodiment. A voice decoder 1305 decodes and expands a voice packet that has been coded and compressed. A linear predictive analyzer 1307 analyzes the formant characteristic of a voice. A switch 1306 switches a signal to be supplied to the linear predictive analyzer 1307 in accordance with the contents of the voice packet. An LSP converter 1308 converts the linear predictive parameter (LSC parameter) into the linear spectrum versus parameter (LSP parameter). An LSP quantization table generator 1309 scans and analyzes the variations on the time base of the LSP parameters, and generates a quantization table whereby the LSP parameters are quantized into the discrete codes. A pitch analyzer 1310 analyzes the frequency and pitch predictive gain of the pitch components, from a residual signal after the linear predictive analysis. A pitch analysis/parameter quantization table generator 1311 scans and analyzes the variations on the time base of the parameters obtained by the pitch analyzer, and generates a quantization table whereby the pitch analysis parameters are quantized into the discrete codes.

Here, the linear predictive analyzer 1307, LSP converter 1308, and pitch analyzer 1310 can be used also for the voice coding algorithm in the voice compression block 13 described in the first embodiment.

Further, as an ID number of the ID field accommodated in the header of the packet in the storage space 2, ID=6 is newly added to the packet quantization table.

(2-2) Operation of the Second Embodiment

The voice compression block 13 of the second embodiment individually generates a group of quantization tables used for the voice coding compression algorithm by one unit of the message voice. In the voice coding system represented by the CELP, the information obtained from the analysis of a voice is replaced with the discrete code by using a quantization table. The quantization table here is designed for a general purpose, and generally, it is able to comply with the characters of voices or the characters of languages of every talker. However, restricting the use to one message voice in a telephone answering device, the variance of the LSP parameter and the pitch analysis parameter is limited, in the characters of voices of a specific talker, specific language, and specific sexuality in a short time. Accordingly, by using to generate a quantization table group specified to one message voice, the message voice can be coded by a limited code information with a comparable sound quality, in comparison to the use of the universal quantization table. Incidentally, to generate the quantization table requires great many arithmetic operations, but the voice compression block 13 in the telephone answering device of this patent application is not necessary to operate in real time during recording a message voice, which will not cause any problem.

When the digital signal processor 1 executes the coding compression to a voice in the voice storage space 2, the voice compression block 13 generates a quantization table group by a unit of one message voice. The digital signal processor 1 accepts a voice packet from the voice storage space 2, and when the contents are already coded by the 8 kbps CELP system, the voice decoder 1305 decodes the voice packet into a voice signal by the PCM code. The switch 1306, when a voice packet read from the voice storage space 2 is the PCM code packet, sends out the PCM code as it is to the linear predictive analyzer 1307. The linear predictive analyzer 1307 and the LSP converter 1308 sequentially read out the packets belonging to the message voice contained in the voice storage space 2, to output the LSP parameters. The LSP quantization table generator 1309, sequentially accepting the LSP parameters, records the frequency of occurrence of the value on the histogram that has fine intervals.

In the same manner, the pitch analyzer 1310 and the pitch analysis/parameter quantization table generator 1311 record the frequency of occurrence of a pitch parameter group. The digital signal processor 1, when completing to scan and analyze one message voice, generates an LSP parameter quantization table and a pitch analysis parameter quantization table. Thereafter, the digital signal processor 1 starts the coding compression of a voice by using the generated quantization tables. Here, before storing the voice packets in the voice storage space 2, the digital signal processor 1 accommodates the generated quantization tables in the packets. Here, ID=6 indicating that the quantization tables are accommodated is set in the ID field of the header of the packet.

Next, the reproduction of the message voice will be described. The digital signal processor 1, when reading out a packet from the voice storage space 2, if it is the quantization table packet, replaces the quantization table used for decoding a compressed voice code by the quantization table read out.

Thereafter, sequentially reading out the packets, the digital signal processor 1 decodes a voice to reproduce.

(2-3) Effect of the Second Embodiment

According to the second embodiment thus described, the quantization table group used for the voice coding compression algorithm can be made exclusively for a specific message voice, the quantization table group optimized in a specific talker, specific language, specific sexuality that uttered the message voice can be obtained, and the coding with a higher sound quality becomes possible in a same information coding speed, compared to the use of the universal quantization table group.

The generation of a quantization table requires a lot of arithmetic operations, but since, in the voice compression block 13 of this embodiment, it is not needed to generate the quantization table in real time during recording the message voice, the generation of the table can be implemented even by a low-capability signal processor.

(3) Third Embodiment

Next, the third embodiment of the voice storage device and the voice coding device according to the invention will now be discussed with reference to the accompanying drawings. In the third embodiment, the 8 kbps CELP coding and the 4 kbps CELP coding in the first embodiment are configured with a hierarchical coding.

(3-1) Configuration of the Third Embodiment

Figure 13:
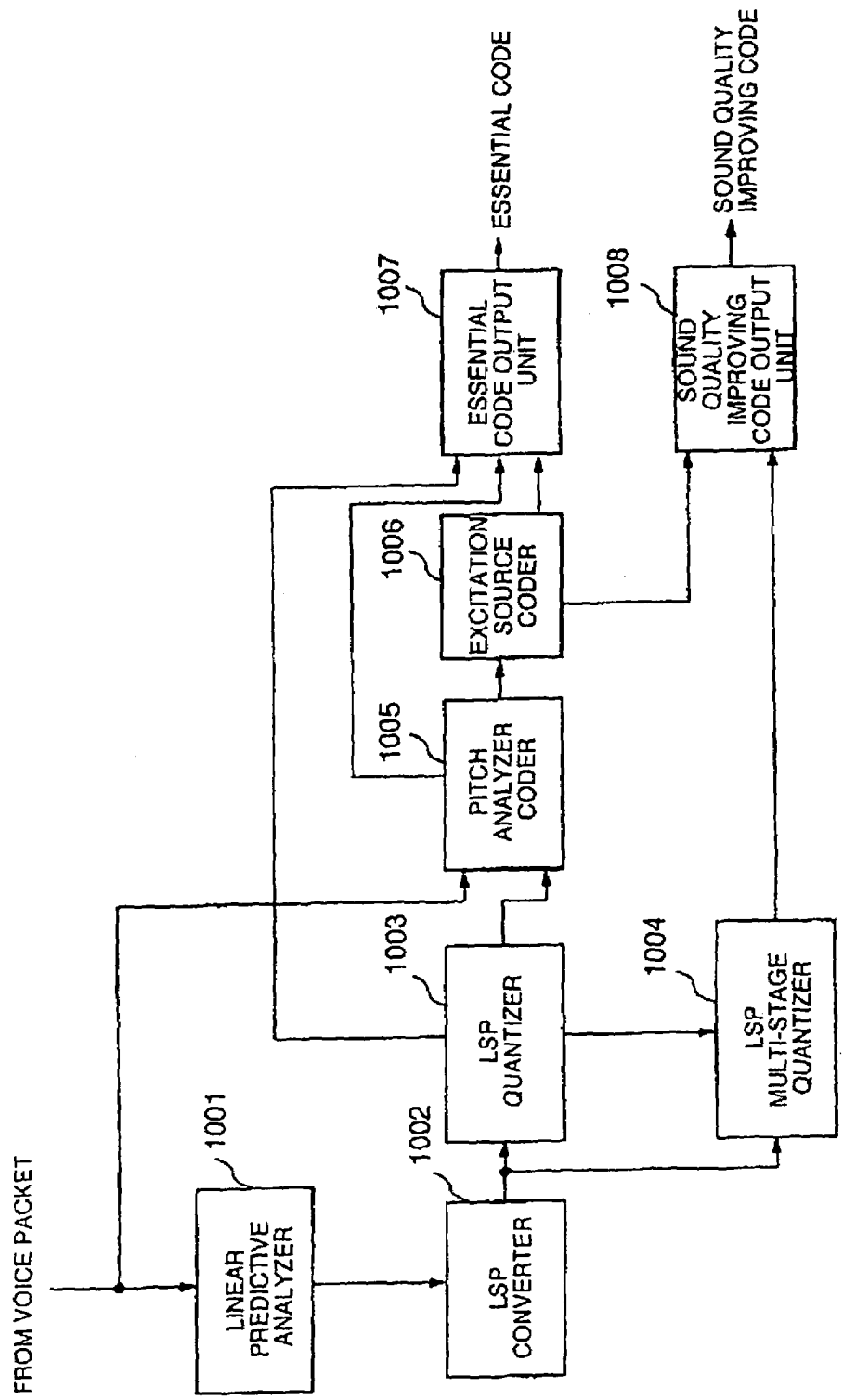
FIG. 13 is a block diagram of a hierarchical coding of the third embodiment.

FIG. 13 illustrates a configuration of the hierarchical coding that implements the third embodiment. A linear predictive analyzer 1001 and an LSP converter 1002 are equivalent to the linear predictive analyzer 1307 and the LSP converter 1308 which have already been described. An LSP quantizer 1003 quantizes the LSP parameters obtained by the LSP converter 1002. An LSP multi-stage quantizer 1004 quantizes the quantization errors of the LSP quantizer 1003 still more accurately. A pitch analyzer coder 1005 attains pitch components in the linear predictive errors, and configures a pitch synthesizing filter. An excitation source coder 1006 codes to generate an excitation signal by using the residual signal with the pitch components removed. Here, the excitation source coder 1006 outputs two types of codes, one having great influence on the decoded sound quality, and another one giving a slight improvement to the decoded voice, by representing the excitation source in a multi-stage code book configuration. An essential code output unit 1007 packs a code giving a great influence on the decoded sound quality from the output of the LSP quantizer 1003, the output of pitch analyzer coder 1005, or the output of excitation source coder 1006. The essential code output unit 1007 outputs at 4 kbps. A sound quality improving code output unit 1008 packs a code to improve the decoded sound quality from the output of the LSP multi-stage quantizer 1004, or the output of the excitation source coder 1006. The sound quality improving code output unit 1008 outputs at 4 kbps.

(3-2) Operation of the Third Embodiment

The linear predictive analyzer 1001 outputs linear predictive parameters, by applying the linear predictive analysis to a voice (discrete value samples) extracted from the voice packet. The LSP converter 1002 converts the linear predictive parameter outputted from the linear predictive analyzer 1001 into a linear spectrum versus LSP parameter. The LSP quantizer 1003 and the LSP multi-stage quantizer 1004 both quantize the LSP parameter outputted from the LSP converter 1002 into the discrete code, in which the LSP quantizer 1003 coarsely quantizes the LSP parameter, and the LSP multi-stage quantizer 1004 quantizes such minute error components that the LSP quantizer 1003 is impossible to express. The pitch analyzer coder 1005 calculates a linear predictive residue from the voice extracted from the voice packet and the quantized value outputted from the LSP quantizer 1003 to acquire pitch components, and outputs residual components after removing the pitch components.

The excitation source coder 1006 codes the residual components after removing the pitch components outputted from the pitch analyzer coder 1005, by the code book searching. Here, the priority is set to plural excitation pulses in accordance with the degree contributing to the sound quality. The excitation source coder 1006 separately outputs an index of the code book corresponding to the high-priority excitation pulse, and an index of the code book corresponding to the low-priority excitation pulse. The essential code output unit 1007 packs the code giving a great influence on the decoded sound quality from the output of the LSP quantizer 1003, the output of pitch analyzer coder 1005, or the output of excitation source coder 1006 to output as a code of 4 kbps. The sound quality improving code output unit 1008 packs the code to improve the decoded sound quality from the output of the LSP multi-stage quantizer 1004, or the output of the excitation source coder 1006 to output as a code of 4 kbps.

Thus, there are outputted two types of codes, one (essential code) being indispensable to decode a voice, the other one (sound quality improving code) that, though not indispensable to decode, helps to improve the sound quality of the decoded voice. The coding rate of the former code is 4 kbps, and the coding rate in which the former and latter codes are combined is 8 kbps.

Further, this embodiment is able to improve the voice compression block 13 of the first embodiment. The voice compression block 13, when the voice frame is required to be compressed by the 8 kbps CELP, combines the essential code and the sound quality improving code of this embodiment to accommodate in the packet. The header ID of the packet is 8 kbps CELP (ID=2). When there occurs a situation afterwards that the voice compression block 13 is required to compress the voice frame compressed by the 8 kbps CELP again by the 4 kbps CELP, instead of decoding a voice by the 8 kbps CELP and coding a voice by the 4 kbps CELP, it is only needed to delete only the 4 kbps code being the sound quality improving code from the packet, and to change the header ID of the packet from ID=2 into ID=3.

(3-3) Effect of the Third Embodiment

According to the third embodiment thus described, when a packet containing a code by the 8 kbps CELP is required to be re-compressed by the 4 kbps CELP, it is only needed to delete part of the packet instead of the decoding and the re-coding. Thereby, it becomes possible to significantly reduce the throughput of the signal processor.

Further, the decoding and re-coding processing requires to re-analyze the voice that has been recovered by using the analysis result once quantized, and further to re-quantize; and accordingly, it involves a deterioration of sound quality in comparison to a case in which the voice is coded and compressed by the 4 kbps CELP system at the beginning. In contrast to this, in case of using the hierarchical coding by the essential code and the sound quality improving code, the re-analysis and the re-quantization are not necessary, so that the deterioration of sound quality can be suppressed to a minimum.

(4) Other Embodiments

In the description of the foregoing embodiments, various modified examples have been mentioned, however there are some other modified embodiments as described hereunder.

In the foregoing embodiments, the packet 201 is specified as a variable length, however it can be replaced by a fixed length packet. When the payload length is less than the data length of the voice frame, the data are stored in the voice storage space 2 to lie across plural packets. When the data length of the voice frame is less than the payload length, the data of plural voice frames are accommodated in one packet, which is stored in the voice storage space 2.

The voice storage space can be implemented by an information recording medium, such as a magnetic tape, magnetic disk, optical disk, hard disk, etc., in addition to the semiconductor memory. Further, it can also be installed more than one in accordance with the type and the significance of the packet.

To indicate the trailing end of the voice message, other than using the end packet, a flag or the like that indicates the end may be applied to the packets containing the coded data. Or, a table that manages the start packet and the end packet of the voice messages may be arranged separately.

In the foregoing embodiments, the voice storage space employs a linear storage space, but it may adopt the file system configuration in case of being used for a computer. With this configuration, the empty area of the storage space becomes easy to control, and the "garbage collection" becomes unnecessary. Further, the empty area generated by the voice compression block becomes quickly reusable to the real time recording block, which facilitates an effective use of the empty area.

Figure 11:
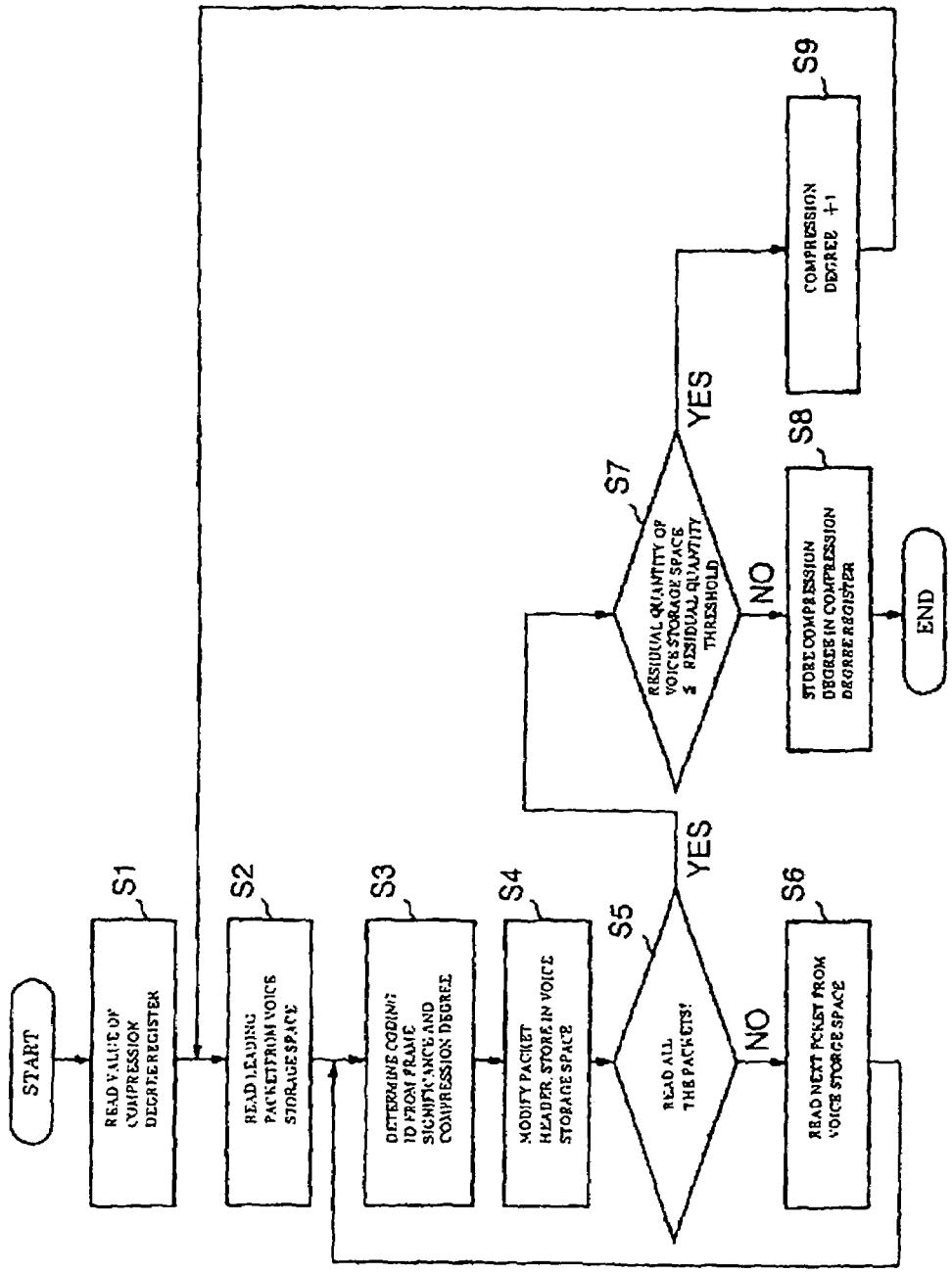
FIG. 11 is a flow chart of the first embodiment.

FIG. 11:
S1: read value of compression degree register
S2: read leading packet from voice storage space
S3: determine coding ID from frame significance and compression degree
S4: modify packet header, store in voice storage space
S5: read all the packets?
S6: read next packet form voice storage space
S7: residual quantity of voice storage space≦residual quantity threshold
S8: store compression degree in compression degree register
S9: compression degree+1

What is claimed is:

1. A voice storage device comprising:
   a storage means for storing a voice signal and a plurality of compression degrees, and
   a voice compression means for compressing the voice signal requiring a re-coding compression, of the voice signal stored in the storage means, in accordance with one of the plurality of compression degrees and a significance of the voice signal,
   wherein the voice compression means executes a coding to a voice signal, in which the coding is divided into one using a code essential to decoding the voice signal and another one using a code to improve a sound quality of a decoded voice.

2. A voice storage device as claimed in claim 1, wherein the storage means stores the voice signal packeted by each coding type.

3. A voice storage device as claimed in claim 1, further comprising a real time processing means for storing a voice signal in real time in the storage means, and a non-vocalization interval detection means for determining a significance of the voice signal in accordance with whether the voice signal corresponds to a vocalization interval or to a non-vocalization interval, at an independent timing from a processing by the real time processing means.

4. A voice storage device as claimed in claim 3, wherein, when a voice signal stored in the storage means corresponds to the vocalization interval, the non-vocalization interval detection means increases the significance of a voice signal before and after the vocalization interval.

5. A voice storage device as claimed in claim 1, wherein the voice compression means compresses a voice signal in parallel to a storage of the voice signal in real time in accordance with a storage capacity of the storage means.

6. A voice storage device as claimed in claim 1, further comprising a record means for recording whether or not a voice signal is read more than once from the storage means, wherein the significance of a voice signal once read is decreased.

7. A voice storage device as claimed in claim 6, wherein, when the voice signal once read is read again, the significance is not changed.

8. A voice storage device as claimed in claim 6, wherein, even when the significance of a voice signal is changed, whether the significance is changed or not is determined in accordance with a storage capacity of the storage means.

9. A voice storage device as claimed in claim 1, wherein the voice compression means includes a quantization table generation means that scans a voice signal stored in the storage means, and generates a quantization table for a coding compression.

10. A voice storage device as claimed in claim 9, wherein the quantization table is packeted to be stored in the storage means, if the quantization table is made from the voice signal, the voice signal is decoded by using the quantization table.

11. A voice storage device comprising:
a storage unit to store a voice signal,
a compression degree register to store a plurality of compression degrees,
a voice compression unit to compress the voice signal requiring a re-coding compression, of the voice signal stored in the storage unit, in accordance with one of the plurality of compression degrees and a significance of the voice signal,
a real time processing unit to store a voice signal in real time in the storage unit; and
a non-vocalization interval detection unit to determine a significance of the voice signal in accordance with whether the voice signal corresponds to a vocalization interval or to a non-vocalization interval, at an independent timing from a processing by the real time processing unit, wherein, when the voice signal stored in the storage unit corresponds to the vocalization interval, the non-vocalization interval detection unit increases the significance of a voice signal before and after the vocalization interval.

12. A voice storage device as claimed in claim 11, wherein the storage unit stores the voice signal packeted by each coding type.

13. A voice storage device as claimed in claim 11, wherein the voice compression unit compresses the voice signal in parallel with storage of the voice signal in real time in accordance with a storage capacity of the storage unit.

14. A voice storage device comprising:
a storage unit to store a voice signal;
a storage unit residual quantity monitor to detect a residual quantity of the storage unit;
a compression reference table to store a plurality of compression degrees;
a voice compression unit to search the compression reference table, determine a compression degree from one of the plurality of compression degrees, and compress the voice signal in accordance with the determined compression degree and a significance of the voice signal;
a real time processing unit to store a voice signal in real time in the storage unit; and
a non-vocalization interval detection unit to determine a significance of the voice signal in accordance with whether the voice signal corresponds to a vocalization interval or to a non-vocalization interval, at an independent timing from a processing by the real time processing unit, wherein, when the voice signal stored in the storage unit corresponds to the vocalization interval, the non-vocalization interval detection unit increases the significance of a voice signal before and after the vocalization interval.

15. A voice storage device as claimed in claim 14, wherein the storage unit stores the voice signal packeted by each coding type.

16. A voice storage device as claimed in claim 14, wherein the voice compression unit compresses the voice signal in parallel with storage of the voice signal in real time in accordance with a storage capacity of the storage unit.

* * * * *